United States Patent [19]

Watanabe

[11] Patent Number: 4,541,018

[45] Date of Patent: Sep. 10, 1985

[54] DROPOUT COMPENSATION AND CHROMINANCE SUBCARRIER FREQUENCY CONVERSION CIRCUIT IN A VIDEO SIGNAL REPRODUCING APPARATUS

[75] Inventor: Yasuaki Watanabe, Kasukabe, Japan

[73] Assignee: Victor Company of Japan, Ltd., Yokohama, Japan

[21] Appl. No.: 318,945

[22] Filed: Nov. 6, 1981

[51] Int. Cl.$^3$ .......................................... H04N 9/491
[52] U.S. Cl. ................................................ 358/314
[58] Field of Search ................ 358/314, 336, 21, 36

[56] References Cited

U.S. PATENT DOCUMENTS

| | | | |
|---|---|---|---|
| 3,463,874 | 8/1969 | Hodge et al. | 358/27 |
| 3,969,757 | 7/1976 | Amery | |
| 4,032,966 | 6/1977 | Kenney et al. | |
| 4,218,696 | 8/1980 | Ushio et al. | |

FOREIGN PATENT DOCUMENTS

| | | | |
|---|---|---|---|
| 2617423 | 10/1976 | Fed. Rep. of Germany | |
| 1323434 | 7/1970 | United Kingdom | 358/314 |
| 1596219 | 8/1981 | United Kingdom | |

*Primary Examiner*—Richard Murray
*Attorney, Agent, or Firm*—Louis Bernat

[57] ABSTRACT

A dropout compensation circuit for a reproduced video signal in a reproducing apparatus for reproducing a composite color video signal recorded in a recording medium, wherein the composite color video signal consists of a luminance signal occupying a predetermined frequency band and a carrier chrominance signal multiplexed with a common frequency band at a high frequency part of the luminance signal, comprises an amplitude modulator for amplitude-modulating a carrier by a reproduced composite color video signal, a delay circuit having a frequency band for passing a part excluding a higher frequency part of an upper side band and a lower frequency part of a lower side band of an output amplitude-modulated signal of the amplitude modulator, and delaying the signal by a predetermined delay time, a demodulating circuit for demodulating an output amplitude-modulated signal of the delay circuit, a detection circuit for detecting dropout within the reproduced composite color video signal, a switching circuit switched over by an output of the detection circuit, for passing and supplying the reproduced composite color video signal when dropout is not detected, and passing and supplying an output signal of the demodulating circuit when dropout is detected, and a circuit for obtaining a luminance signal compensated of the dropout from the signal passed through the switching circuit.

3 Claims, 5 Drawing Figures

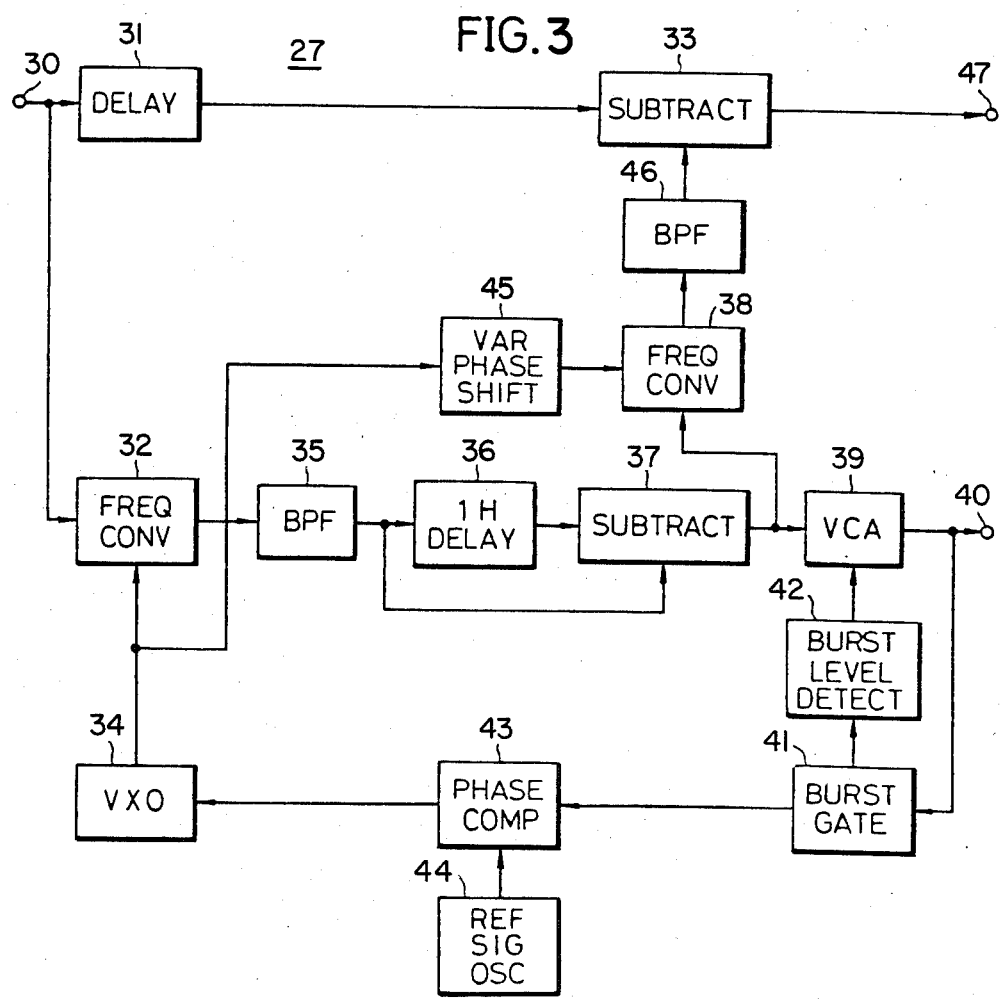

DROPOUT COMPENSATION AND CHROMINANCE SUBCARRIER FREQUENCY CONVERSION CIRCUIT IN A VIDEO SIGNAL REPRODUCING APPARATUS

BACKGROUND OF THE INVENTION

The present invention generally relates to dropout compensation circuits for reproduced video signals in reproducing apparatuses, and more particularly to a dropout compensation circuit capable of effectively compensating for dropouts in a luminance signal within a color video signal reproduced from a recording medium in a reproducing apparatus.

Generally, when reproducing a recorded signal from a rotary recording medium by a reproducing stylus, dropouts are instantaneously introduced in the reproduced signal in a case where the reproducing stylus skips due to dust particles, scratches, and the like on the surface of the rotary recording medium. These signal dropouts are also generated when reproducing a recording medium such as a magnetic tape. Accordingly, as a conventional circuit for compensating for the dropouts, there was a circuit consisting of a detecting circuit for detecting the dropout, a delay circuit for delaying the reproduced composite color video signal, and a circuit for using the output of the delay circuit instead of the dropout part of the reproduced composite color video signal when the dropout is detected by the detecting circuit.

However, a delay circuit having a wide frequency band must be used in order to delay the whole reproduced composite color video signal. Hence, there was a disadvantage in that the conventional dropout compensation circuit could not be constructed at low cost. Further, there was a problem in that when a delay operation is performed with a wide frequency band, it is difficult to match the phase of the color signal.

On the other hand, a delay line having glass as the medium for delaying a signal by an interval of 1H (H indicates a horizontal scanning period), that is, a so-called 1H glass delay line, is low in cost. However, the operational frequency band of the above 1H glass delay line is narrow, and cannot be used independently for the above described conventional dropout compensation circuit.

SUMMARY OF THE INVENTION

Accordingly, it is a general object of the present invention to provide a novel and useful dropout compensation circuit for a reproduced video signal in a reproducing apparatus, in which the above described disadvantages have been overcome.

Another and more specific object of the present invention is to provide a dropout compensation circuit for a reproduced video signal, in which a reproduced composite color video signal is amplitude-modulated and then passed through a delay circuit to obtain a delayed luminance signal, and compensate for dropouts in the luminance signal by use of the delayed luminance signal in a reproducing apparatus.

Other objects and further features of the present invention will be apparent from the following detailed description when read in conjunction with the accompanying drawings.

BRIEF DESCRIPTION OF THE DRAWINGS

FIG. 3 is identical to FIG. 2 of co-pending Application Ser. No. 310,131, filed Oct. 9, 1981, which is repeated here to illustrate one exemplary circuit which may be used in box 19 of this application.

DETAILED DESCRIPTION

Figure 1:
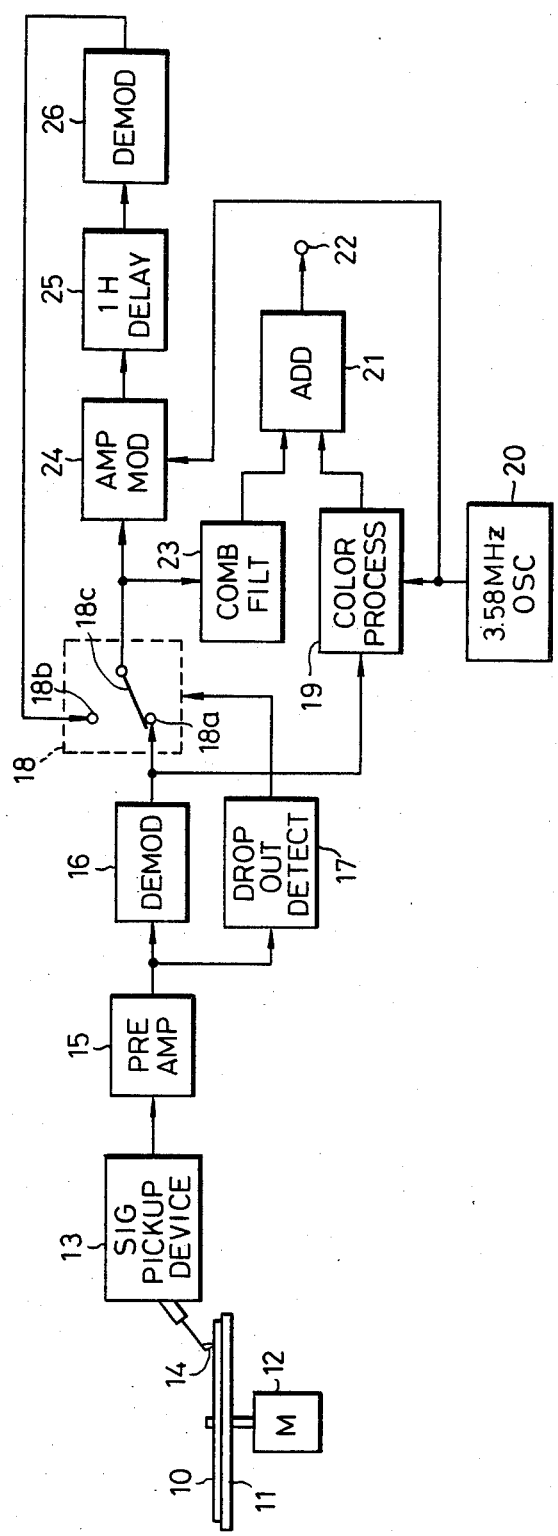
FIG. 1 is a systematic block diagram showing a rotary recording medium reproducing apparatus applied with an embodiment of a dropout compensation circuit for a reproduced video signal according to the present invention.

In FIG. 1, a rotary recording medium (hereinafter simply referred to as a disc) 10 is recorded with a composite color video signal on a spiral track, as variations in geometrical configuration. The disc 10 is placed onto a turntable 11 and rotated by a motor 12.

Figure 2A:
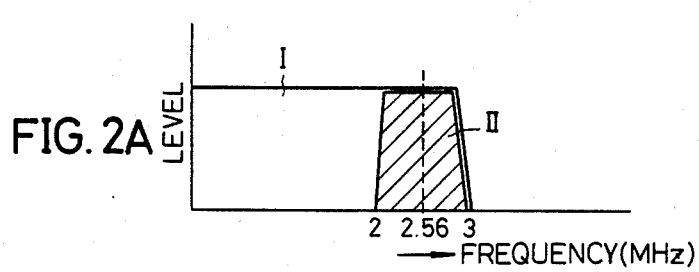
FIGS. 2A, 2B, and 2C are diagrams respectively showing frequency spectrums of signals at each part of the block system shown in FIG. 1.

As indicated in FIG. 2A, for example, the above composite color video signal consists of a luminance signal indicated by I and a carrier chrominance signal indicated by II, obtained from the NTSC system color video signal, respectively. The luminance signal has a frequency band (zero to 3 MHz) wherein the upper limit frequency is bandlimited to approximately 3 MHz. On the other hand, the carrier chrominance signal has a frequency band (2.56 MHz±500 kHz) which is frequency-converted into a frequency band at a high frequency range part of the frequency band I of the above luminance signal and multiplexed with a common frequency band by frequency-interleaving. The composite color video signal is recorded in a state where the above signals as a whole is frequency-modulated. A signal pickup device 13 has a reproducing stylus 14, and reproduces the recorded signal according to variations in electrostatic capacitance between the disc surface of the disc 10 and the reproducing stylus 14.

The signal reproduced by the signal pickup devices 13 is supplied through a preamplifier 15 to a demodulator 16 and a dropout detection circuit 17. The above signal reproduced by the signal pickup device 13 is a frequency-modulated signal, and is demodulated at the demodulator 16. Hence, a demodulated composite color video signal indicated in FIG. 2A is obtained from the demodulator 16. This demodulated signal is supplied to a contact point 18a of a switching circuit 18, and also to a color signal processing circuit 19.

The dropout detection circuit 17 consists of a conventional dropout detection circuit using a re-triggerable multivibrator or an envelope detection circuit and the like, and detects the dropout within the frequency-modulated reproduced signal. A contact member 18c of the switching circuit 18 is normally connected to the contact point 18a. When a detected output is obtained from the dropout detection circuit 17, the contact member 18c is switched over and connected to a contact point 18b of the switching circuit 18. In FIG. 1, the switching circuit 18 is diagrammatized and shown as a mechanical switch, however, in reality, an analog switch which is switched over electronically, is used for the switching circuit 18.

The color signal processing circuit 19 performs a dropout compensation operation with respect to the carrier chrominance signal of the demodulated signal supplied thereto. Moreover, the color signal processing circuit 19 performs color signal processing such as returning the carrier chrominance signal which is frequency-converted by the above recording system to the carrier chrominance signal having the original center frequency of 3.58 MHz, by use of a frequency signal of 3.58 MHz supplied from an oscillator 20. The carrier chrominance signal subjected to the above signal processing, is supplied to an adding circuit 21. Details of the circuits of the color signal processing circuit 19 and oscillator 20 are described in U.S. patent application Ser. No. 310,131, filed Oct. 9, 1981, by Yasuaki Watanabe, and entitled "Color Video Signal Processing Circuit For Performing Level Control And Time Axis Deviation Compensation". Both this application and Ser. No. 310,131 are by the same inventor and assigned to the same assignee.

On the other hand, the output signal of the demodulator 16 indicated in FIG. 2A which has passed through the switching circuit 18, is supplied to comb filter 23 and an amplitude modulator 24. The carrier chrominance signal indicated by the frequency band II of the signal indicated in FIG. 2A is eliminated at the comb filter 23. Hence, only the luminance signal having the frequency band I which passes through the comb filter 23, is supplied to the adding circuit 21. The carrier chrominance signal from the above color signal processing circuit 19 and the luminance signal from the comb filter 23 are added at the adding circuit 21. Accordingly, the color video signal thus obtained is supplied to a television receiver through an output terminal 22, and reproduced as a color picture.

Figure 2B:
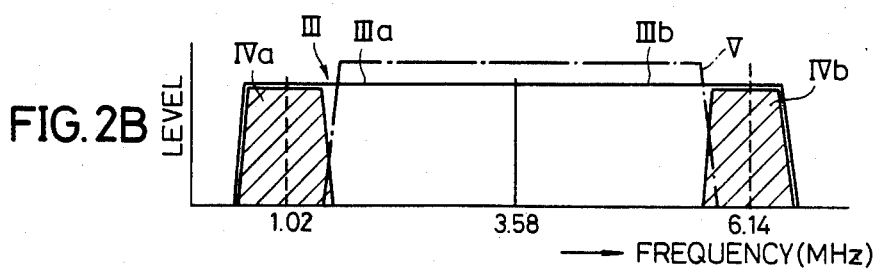

In a state where no detected output is obtained from the dropout detection circuit 17 and the contact member 18c of the switching circuit 18 is connected to the contact point 18a, the signal from the demodulator 16 indicated in FIG. 2A is supplied to the above comb filter 23 and the amplitude modulator 24, through the switching circuit 18. The amplitude modulator 24 performs amplitude-modulation by the signal from the demodulator 16, using the frequency signal of 3.58 MHz obtained from the oscillator 20 as the carrier. Accordingly, the frequency spectrum of the output amplitude-modulated signal of the amplitude modulator 24 becomes as indicated by III in FIG. 2B. This frequency spectrum has a lower side band IIIa and an upper side band IIIb about a center frequency which is the carrier frequency of 3.58 MHz. The carrier chrominance signal II appears as indicated by IVa at the lower frequency part of the lower side band IIIa and as indicated by IVb at the higher frequency part of the upper side band IIIb, in the amplitude-modulated signal.

Figure 2C:
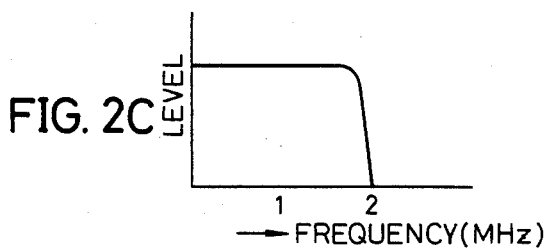

The above output amplitude-modulated signal is supplied to an 1H glass delay line 25, and delayed by an interval of 1H. This 1H glass delay line 25 is low in cost, however, the 1H delay line 25 has a relatively narrow frequency band of approximately 1.6 MHz to 5.6 MHz. Hence, when the output amplitude-modulated signal of the amplitude modulator 24 passes through the 1H glass delay line 25, the output amplitude-modulated signal is not only delayed, but also limited of the frequency band. Accordingly, the above output amplitude-modulated signal thus passed through the 1H glass delay line 25 is supplied to a demodulator 26 as a signal having a frequency band indicated by V in FIG. 2B, and demodulated thereat. The signal thus demodulated at the demodulator 26 is applied to the contact point 18b of the switching circuit 18. The output demodulated signal of the demodulator 26, is a signal obtained by demodulating the amplitude-modulated signal limited of the frequency band and having the frequency band V. As indicated in FIG. 2C, the above output demodulated signal of the demodulator 26 is a luminance signal having a frequency band of zero to 2 MHz.

When the dropout detection circuit 17 detects a dropout within the reproduced signal, the contact member 18c of the switching circuit 18 is switched over from the contact point 18a and connected to the contact point 18b by the output signal of the dropout detection circuit 17. Accordingly, the signal from the demodulator 26 which is delayed by the interval of 1H, that is, the signal of an interval of 1H before the point in time when the dropout is generated, having no dropout, is supplied to the comb filter 23 and the amplitude modulator 24, through the switching circuit 18. The above delayed luminance signal indicated in FIG. 2C passes through the comb filter 23 as it is, and is then supplied to the adding circuit 21. Therefore, a color video signal compensated of the dropout, is obtained from the output terminal 22.

In a case where the dropout continues throughout an interval of over 1H, the contact member 18c of the switching circuit 18 remains in a state connected to the contact point 18b during that interval. Hence, the already delayed signal is further delayed, and used as a compensated signal having no dropout. Therefore, during the interval in which compensation is performed with respect to the dropout, the frequency band of the luminance signal which is added with the carrier chrominance signal at the adding circuit 21 is zero to 2 MHz, and is narrower than the original frequency band of zero to 3 MHz. However, the interval of the dropout introduced upon reproduction of the disc 10 is generally in the range of several H at the most. Thus, even when the frequency band of the luminance signal becomes narrow to the above described extent, the visual effect due to the dropout having an interval of the above range is exceedingly small, and is practically negligible.

Moreover, the 1H delay line 25 is not limited to the above glass delay line, and may be a charge transfer element having a narrow frequency band such as a charge-coupled device (CCD).

Further, this invention is not limited to these embodiments but various variations and modifications may be made without departing from the scope of the invention. Next, a description will be given with respect to an embodiment of the color video signal processing circuit 19 (FIG. 2), in conjunction with a block system shown in FIG. 3. This block diagram is taken from U.S. application Ser. No. 310,131, filed Oct. 9, 1981, which may be consulted for further details.

A demodulated signal obtained from the demodulator 16 (FIG. 2) is supplied through a terminal 30 to a delay circuit 31 (FIG. 3) and a frequency converter 32. The demodulated signal from the demodulator 16 has a frequency spectrum which includes a luminance signal occupying a frequency band between zero and 3 MHz, and a carrier chrominance signal occupying a frequency band within a range of ±500 kHz from a center which is a chrominance sub-carrier frequency of 2.56 MHz. The above carrier chrominance signal is multiplexed in a state using a common frequency band within a high frequency range of the luminance signal.

The demodulated signal is supplied to the delay circuit 31, is delayed by a delay quantity which is equal to a delay quantity added to a signal within a circuit system for obtaining the carrier chrominance signal which will be described hereinafter. That is, the above demodulated signal is delayed in order to adjust the timing of the signal, and then supplied to the subtracting circuit 33.

The frequency converter 32 consists of a balanced modulator, and is supplied with an output oscillation signal of 6.14 MHz from a voltage controlled crystal oscillator (hereinafter simply referred to as a VXO)34. The frequency converter 32 subjects the above signal of 6.14 MHz to a balanced modulation with the demodulated signal obtained from the terminal 30. An output signal of the frequency converter 32 is supplied to a bandpass filter 35. The output signal of the above frequency converter 32 has a frequency spectrum wherein a carrier chrominance signal component of a frequency band of 3.58 MHz±500 kHz exists at the lower side of the frequency band. The luminance signal is passed through the bandpass filter 35.

The signal component which has passed through the bandpass filter 35 is supplied directly to a subtracting circuit 37 on one hand, and supplied to the subtracting circuit 37 through a 1H-delay circuit 36 (H indicates a horizontal scanning period) on the other hand. The 1H-delay circuit 36 and the subtracting circuit 37 form a known comb filter. Subtraction is performed between the signal from the bandpass filter 35 and the signal from the 1H-delay circuit 36. Hence, only the carrier chrominance signal having a frequency band of 3.58 MHz±500 Hz is obtained. This carrier chrominance signal has a chrominance sub-carrier frequency of 3.58 MHz, and is returned to the original frequency band.

The output signal of the subtracting circuit 37 is supplied to a frequency converter 38 which will be described hereinafter, and also to a voltage controlled amplifier (hereinafter simply referred to as a VCA)39. The carrier chrominance signal which has passed through the VCA 39 is obtained through an output terminal 40, and also supplied to a burst gate circuit 41. The color burst signal is extracted at the burst gate circuit 41, and supplied to a burst level detection circuit 42 and to a phase comparator 43.

The level of the extracted color burst signal is detected at the burst level detection circuit 42, and the detection circuit 42 applies a control voltage which is in accordance with the detected level to the VCA 39. The amplification of the VCA 39 is controlled by the control signal from the burst level detection circuit 42, so that the level of the color burst signal is constant. Accordingly, even when the color burst signal is recorded at a relatively low level in the recording system due to the relationship between the carrier chrominance signal level, the level of the color burst signal is always controlled to a constant level by a loop constructed by the above described VCA 39, the burst gate circuit 41, and the burst level detection circuit 42. Thus, the level of the color burst signal within the carrier chrominance signal obtained from the terminal 40 is always maintained to a constant level.

The phase of the color burst signal supplied to the phase comparator 43 is compared with the phase of a reference signal having a stable frequency of 3.58 MHz. An output error voltage obtained from the phase comparator 43 is applied to the VXO 34, to variably control the oscillation frequency of VXO 34. The demodulated video signal applied to the terminal 30 includes time axis deviation components due to rotational deviation, eccentricity, and the like introduced in the disc. Accordingly, the time axis deviation is included in the output of the VXO 34, due to an automatic phase compensation (APC) loop including the frequency converter 32, the bandpass filter 35, 1H-delay circuit 36, the subtracting circuit 37, the VCA 39, the burst gate circuit 41, the phase comparator 43, a reference signal oscillator 44, and the VXO 34. This time axis deviation component is eliminated by the frequency converter 32. Therefore, the time axis deviation component is eliminated from the carrier chrominance signal which is obtained through the terminal 40.

In addition, box 19 (FIG. 2) may be the same as FIG. 4 of U.S. Pat. No. 4,268,854. The oscillator 20 may be any 3.58 MHz oscillator.

What is claimed is:

1. A dropout compensation and chrominance subcarrier frequency conversion circuit in a video signal reproducing apparatus, said reproducing apparatus reproducing a pre-recorded composite color video signal from a recording medium, said pre-recorded composite color video signal comprising a luminance signal which is band-limited in the high frequency part thereof to occupy a predetermined frequency band and a carrier chrominance signal which is frequency-converted into a low frequency band to be band-share-multiplexed with the high frequency part of the band-limited luminance signal, said dropout compensation and chrominance subcarrier frequency conversion circuit comprising:

amplitude modulator means for amplitude-modulating a carrier by a composite color video signal which is reproduced from said recording medium;

delay circuit means for delaying an amplitude-modulating signal from said amplitude modulator means by a predetermined delay time, said delay circuit means having a frequency band which only passes a signal in a predetermined frequency band between a frequency band part of a carrier chrominance signal which exists in the high frequency part of an upper side band of said amplitude-modulated signal and a frequency band part of a carrier chrominance signal which exists in the low frequency part of a lower side band of said amplitude-modulated signal;

demodulating circuit means for demodulating an output amplitude-modulated signal of said delay circuit;

detecting circuit means for detecting a dropout in the reproduced composite color video signal;

switching circuit means switched over in response to an output of said detecting circuit, said switching circuit being switched to supply the reproduced composite color video signal to said amplitude modulator means in the absence of a detected dropout in said detecting circuit, and to supply an output signal of said demodulating circuit means to said amplitude modulator means in the presence of a detected dropout in said detecting circuit;

eliminating means for eliminating from an output signal of said switching circuit means the carrier chrominance signal which exists in the high frequency part of the band-limited luminance signal;

carrier chrominance signal processing means for subjecting the reproduced composite color video signal to a predetermined signal processing, said predetermined signal processing including a frequency conversion of the carrier chrominance signal back to an original frequency band thereof before it was frequency-converted into the low frequency band for recording; and adding means for adding an output luminance signal of said eliminating means and an output carrier chrominance signal of said carrier chrominance signal processing means, and for producing a color video signal;

said chrominance signal processing means including a single oscillator which produces a predetermined signal having a frequency equal to an original chrominance subcarrier frequency of the carrier chrominance signal before it was frequency-converted into the low frequency band for recording, said predetermined signal produced from said oscillator being used for the frequency conversion in said carrier chrominance signal processing means, and being supplied to said amplitude modulator as said carrier.

2. The dropout compensation and chrominance subcarrier frequency conversion circuit as claimed in claim 1 in which said delay circuit means comprises a glass delay line having a glass medium, said predetermined delay time of said delay circuit being equal in duration to one horizontal scanning period of the color vidoe signal, and said eliminating means comprising a comb filter.

3. A dropout compensation and chrominance subcarrier frequency conversion circuit in a video signal reproducing apparatus, said reproducing apparatus reproducing a pre-recorded composite color video signal from a recording medium, said pre-recorded composite color video signal comprising a luminance signal which is band-limited in the high frequency part thereof to occupy a predetermined frequency band and a carrier chrominance signal which is frequency-converted into a low frequency band to be band-share-multiplexed with the high frequency part of the band-limited luminance signal, said dropout compensation and chrominance subcarrier frequency conversion circuit comprising:

amplitude modulator means for amplitude-modulating a carrier by a composite color video signal which is reproduced from said recording medium;

delay circuit means for delaying an amplitude-modulated signal from said amplitude modulator means by a predetermined delay time, said delay circuit means having a frequency band which only passes a signal in a predetermined frequency band between a frequency band part of a carrier chrominance signal which exists in the high frequency part of an upper side band of said amplitude-modulated signal and a frequency band part of a carrier chrominance signal which exists in the low frequency part of a lower side band of said amplitude-modulated signal;

demodulating circuit means for demodulating an output amplitude-modulated signal of said delay circuit;

detecting circuit means for detecting a dropout in the reproduced composite color video signal;

switching circuit means switched over in response to an output of said detecting circuit, said switching circuit being switched to supply the reproduced composite color video signal to said amplitude modulator means in the absence of a detected dropout in said detecting circuit, and to supply an output signal of said demodulating circuit means to said amplitude modulator means in the presence of a detected dropout in said detecting circuit; and eliminating means for eliminating from an output signal of said switching circuit means the carrier chrominance signal which exists in the high frequency part of the band-limited luminance signal.

* * * * *